Dec. 23, 1969 J. A. HIRSCH 3,486,044
PERCENTAGE ON-OFF TIMING CIRCUIT
Filed Feb. 28, 1966
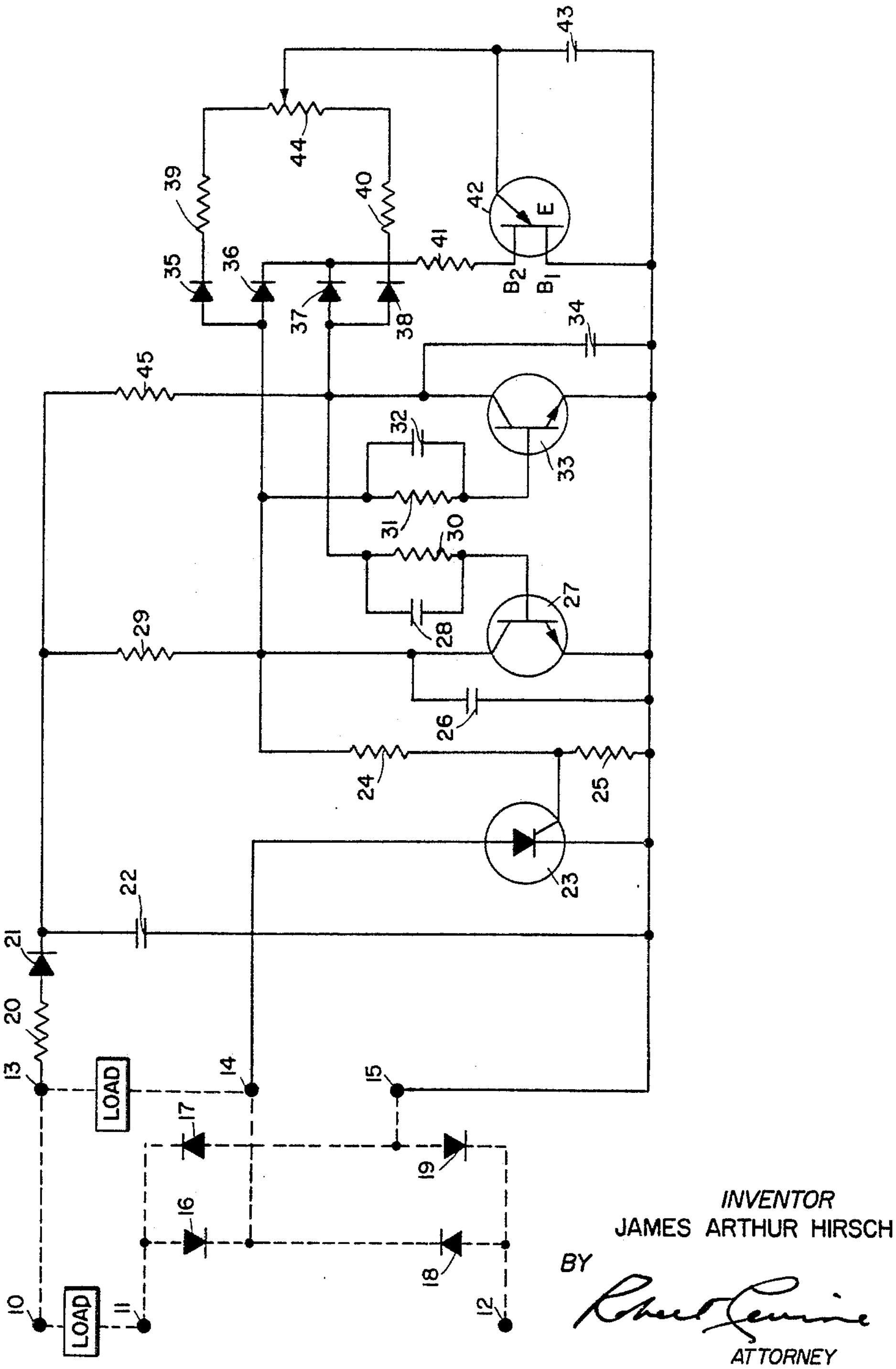
INVENTOR
JAMES ARTHUR HIRSCH
BY Robert Levine
ATTORNEY United States Patent Office 3,486,044
Patented Dec. 23, 1969

3,486,044

PERCENTAGE ON-OFF TIMING CIRCUIT

James Arthur Hirsch, Indianapolis, Ind., assignor to P. R. Mallory & Co. Inc., Indianapolis, Ind., a corporation of Delaware Filed Feb. 28, 1966, Ser. No. 530,510
Int. Cl. H03k 17/28
U.S. Cl. 307—293 5 Claims

ABSTRACT OF THE DISCLOSURE

A percentage on-off timing circuit includes a divider circuit having a pair of complementary impedance networks and an adjusting means for adding impedance to the first of said networks and subtracting an equal impedance from the second of said networks.

The present invention relates to electronic timers and more particularly to the means and methods for providing a percentage on-off timer having an adjusting means for varying the percentage on time and percentage off time as well as the total cycle time.

In many applications it is desirable to have a timer that is on a given portion of the cycle time and remains off for the remainder of the cycle. This type of timer is referred to as a percentage on-off timer. Cam-operated timers have been used as percentage on-off timers. However, if the requirements are such that the on-off times must be adjustable, a very complicated cam-operated timer is required. In fact, two cam-operated timers must be ganged together in an awkward manner in order to obtain the adjustable features of the present invention.

Accordingly, there is presented in this specification an electronic timer having a novel means for varying the percentage on time and percentage off time as well as the total cycle time.

The electronic timer of the present invention is much more reliable than a mechanical timer for accomplishing the same timing operation.

It is an object of the present invention, therefore, to provide a reliable, efficient, and inexpensive electronic timer having an adjusting means for varying the percentage on time and percentage off time as well as the total cycle time.

It is another object of the present invention to provide a timer for energizing an electronic switching means for conducting current through a load for a predetermined percentage of the cycle time.

It is still another object of the present invention to provide an electronic timer including a divider circuit having a pair of complementary impedance networks and an adjusting means for adding impedance to a first of said networks and subtracting an equal impedance from a second of said networks.

It is a further object of the present invention to provide an electronic timer including a divider circuit having a pair of complementary resistance networks and an adjusting means for adding resistance to a first of said networks and substracting an equal resistance from a second of said networks.

It is yet another object of the present invention to provide an electronic timer which is connected to and energized by a half-wave power source.

It is still a further object of the present invention to provide an electronic timer including a bistable multivibrator having a first conducting state and a second conducting state, a timing circuit for alternately changing the state of said bistable multivibrator, an adjusting means for determining the duration of said first and second conducting states, and an electronic switching means for conducting current through a load when said bistable multivibrator is in said first conducting state.

The present invention, in another of its aspects, relates to novel features of the instrumentalities described herein for teaching the principal object of the invention and to the novel principles employed in the instrumentalities whether or not these features and principles may be used in the said object and/or in the said field.

Other objects of the invention and the nature thereof will become apparent from the following description considered in conjunction with the accompanying drawing and wherein like reference numbers describe elements of similar function therein and wherein the scope of the invention is determined rather from the dependent claims.

For illustrative purposes, the invention will be described in conjunction with the accompanying drawing in which there is shown a schematic of the percentage timer of the present invention.

Generally speaking, the present invention is an electronic timer comprising: a power source; a bistable multivibrator having a first conducting state and a second conducting state, said bistable multivibrator being connected to said power source; and electronic switching means for conducting current from said power source through a load when said bistable multivibrator is in said first conducting state and for preventing current flow through said load when said bistable multivibrator is in said second conducting state, said electronic switching means being connected to said multivibrator and in circuit with said power source and said load; a timing circuit for providing an output for alternately changing said conducting states of said bistable multivibrator, said timing circuit being connected to said bistable multivibrator; and an adjustable means for determining the time duration for said first conducting state and said second conducting state, said adjustable means being connected to said bistable multivibrator and said timing circuit.

Referring now to the drawing, the components and the circuitry of the present invention can be visualized in conjunction with the following discussion.

Terminals 10 through 15 are input terminals for the percentage timer. A half-wave power supply consisting of the resistor 20, diode 21, and capacitor 22 are connected in series across the terminals 10 and 15. The terminals 11 and 12 are inputs to a bridge network consisting of the diodes 16, 17, 18, and 19. The outputs of the bridge network are connected to the terminals 14 and 15. The bridge network is shown in dotted lines in the drawing to indicate that it is optional to the balance of the circuitry.

The terminal 14 is connected to the anode of the silicon controlled rectifier 23 and the terminal 15 is connected to the cathode of the silicon controlled rectifier 23.

There is a bistable multivibrator circuit consisting of the transistors 27 and 33, capacitors 26, 28, 32 and 34, and resistors 29, 30, 31 and 45. The capacitor 28 is shunted across the base resistor 30 and the capacitor 32 is shunted across the base resistor 31. The stabilizing capacitor 26 is coupled across the emitter-collector circuit of the transistor 27 and the stabilizing capacitor 34 is coupled across the emitter-collector circuit of the transistor 33. There is a voltage divider circuit consisting of the resistors 24 and 25 connected across the emitter-collector circuit of the transistor 27. The junction of the resistors 24 and 25 is connected to the gate of the silicon controlled rectifier 23. The resistors 29 and 45 connect the collectors of the transistors 27 and 33, respectively, to the voltage source.

The collector of the transistor 27 is connected to the anode of the diode 36 and the collector of the transistor 33 is connected to the anode of the diode 37. The cathodes of the diodes 36 and 37 are connected together. The anode of the diode 35 is connected to the anode of the diode 36 and the anode of the diode 38 is connected to the anode of the diode 37. The resistor 39, the resistor portion of the adjustable resistor 44, and the resistor 40 are connected in series between the cathode of the diode 35 and the cathode of the diode 38.

There is a unijunction transistor timing circuit consisting of the resistors 41, unijunction transistor 42, and capacitor 43. The voltage for charging the capacitor is provided through the wiper contact of the adjustable resistor 44 which is connected to the junction between the emitter terminal of the unijunction transistor 42 and the capacitor 43. The resistor 41 is connected between the B2 electrode of the unijunction transistor and the junction of the cathodes of the diodes 36 and 37.

With the above description of components and circuitry in mind, and by making reference to the drawing, the following analysis of operation will serve to convey the functional details of the present invention.

The silicon controlled rectifier 23 is an electronic switching means for conducting current through the load, said load being connected to either the terminal 14 or 11 depending on whether the bridge network is utilized and to the terminal 10. Thus, when ever the silicon controlled rectifier is gated on, by the bistable multivibrator being trigged, current can flow through the load.

The bistable multivibrator circuit is a circuit means having a first conducting state and a second conducting state. When the bistable multivibrator is in the first conducting state, the transistor 27 is nonconducting and the voltage across he emitter-collector circuit of the transistor 27 is applied through the divider network of the resistors 24 and 25 to the gate of the silicon controlled rectifier 23.

The unijunction transistor 42 circuit is a timing circuit for providing a timed base output for triggering the bistable multivibrator, thereby causing the bistable multivibrator to change from one conducting state to the other.

The diode and resistor network consisting of the diodes 35 and 38, resistors 39 and 40, and the adjustable resistor 44 is an adjustable means for determining the time interval for the unijunction transistor 42 timing circuit. The operation of the diode and resistor network in determining the percentage on-off time for the circuitry will be discussed in the following paragraphs.

When the bistable multivibrator is in the first conducing state, the transistor 27 is nonconducting, the resistance that will determine the time interval for charging the capacitor 43 to the firing voltage of the unijunction transistor is the resistor 39 and the portion of the adjustable resistor 44 which is directly connected to the resistor 39 and connected by the wiper to the capacitor 43. Similiarly, when the bistable multivibrator circuit is in the second conducting state, when the transistor 33 is nonconducting, the resistance that will determine the time interval for the timing circuit is the resistor 40 and the portion of the adjustable resistor 44 which is directly connected to the resistor 40 and connected by the wiper to the capacitor 43.

When the unijunction transistor 42 fires, it causes the nonconducting transistor 27 or 33 to be shunted for a short time with a very low resistance, thereby reducing the voltage across it. Simultaneously, the firing of the unijunction transistor 42 causes the base of the conducting transistor 27 or 33 to become negative, thereby turning the conducting transistor off. When the unijunction transistor 42 recovers, the transistor 27 or 33 formerly conducting is nonconducting and the transistor 27 or 33 formerly conducting is nonconducting and the transistor 27 or 33 formely nonconducting is conducting. Thus, each time the unijunction transistor 42 fires, the bistable multivibrator is triggered.

The circuit of the present invention is a percentage on-off timing circuit because the timing resistance from the cathode of either of the diodes 35 or 38 to the wiper of the adjustable resistor 44 is some given percentage of the total resistance between the cathode of the diode 35 and the cathode of the diode 38. Any change in any other item in the circuit upon which the timing depends will change both the on time and off time equally and, therefore, will not change the percentages. For instance, an adjustable resistor located between the wiper of the adjustable resistor 44 and the capacitor 43 would permit adjustment of the total cycle time without changing the percentage on-off times.

The circuit of the present invention can obviously be modified so as to produce two alternate times, each independently adjustable.

The circuitry of the present invention, as hereinbefore described in one of its embodiments, is merely illustrative and not exhaustive in scope. Since many widely different embodiments of the invention may be made without departing from the scope thereof, it is intended that all matter contained in the above description and shown in the accompanying drawing shall be interposed as illustrative and not in a limiting sense.

What is claimed is:

1. A percentage on-off timing circuit for energizing an electronic switching means comprising: a power source; a bistable multivibrator having first and second conducting states connected to said power source; an electronic switching means connected to said bistable multivibrator and said power source; a timing circuit connected to said bistable multivibrator providing an output alternately changing said conducting states; and an adjustable means connected to said timing circuit and said bistable multivibrator determining the time duration of said first and second conducting states, said adjustable means including complementary diode-resistor circuits coupled to a variable resistor means.

2. A percentage on-off timing circuit as in claim 1 wherein said power source is a half-wave power source.

3. A percentage on-off timing circuit as in claim 1 wherein said power source is a half-wave power source comprising a unidirectional semiconductive device, a resistor, and a capacitor connected to an alternating current power source.

4. A percentage on-off timing circuit as in claim 1 wherein said timing circuit includes a unijunction transistor having an emitter electrode, base-one electrode, and base-two electrode, and a capacitor coupled across said emitter electrode and said base-one electrode, said capacitor being charged to a predetermined level by said adjusting means so as to fire said unijunction transistor after a predetermined time interval.

5. A percentage on-off timing circuit for energizing an electronic switching means comprising: a power source, a bistable multivibrator having a first conducting state and a second conducting state, said bistable multivibrator connected to said power source; a semiconductive device having an anode electrode, a cathode electrode, and a gate electrode controlling conduction between said anode electrode and said cathode electrode, said anode electrode and said cathode electrode connected to said power source, said gate electrode connected to said bistable multivibrator so as to permit current flow from said power source when said bistable multivibrator is in said first conducting state and so as to prevent current flow when said bistable multivibrator is in said second conducting state; a unijunction transistor timing circuit providing an output for alternately changing said conducting states of said bistable multivibrator, said timing circuit connected to said bistable multivibrator; and a divider circuit including a pair of complementary diode-resistor circuits coupled to a variable resistor means adding resistance to a first of said diode-resistor circuits and subtracting an equal resistance from a second of said diode-resistor circuits, said divider circuit connected to said timing circuit and to said bistable multivibrator so as to determine time durations for said first and second conducting states.

References Cited

UNITED STATES PATENTS

| | | | |
|---|---|---|---|
| 3,248,634 | 4/1966 | Fudgley et al. | 307—301 X |
| 3,259,825 | 7/1966 | James | 307—252 X |
| 3,259,854 | 7/1966 | Maras et al. | 307—301 X |
| 3,320,440 | 5/1967 | Reed | 307—247 |
| 3,327,134 | 6/1967 | Keane | 307—293 X |
| 3,334,243 | 8/1967 | Cooper | 307—293 |
| 3,385,957 | 5/1968 | Munson et al. | 219—501 |
| 3,386,013 | 5/1968 | Hirsch | 317—142 |
| 3,397,323 | 8/1968 | Hirsch | 307—293 X |

JOHN S. HEYMAN, Primary Examiner

R. C. WOODBRIDGE, Assistant Examiner

U.S. Cl. X.R.

307—247, 252, 301